No. 686,225. Patented Nov. 5, 1901.
O. HUGHES.
FRICTION CLUTCH.
(Application filed Apr. 23, 1901.)
(No Model.) 2 Sheets—Sheet 1.
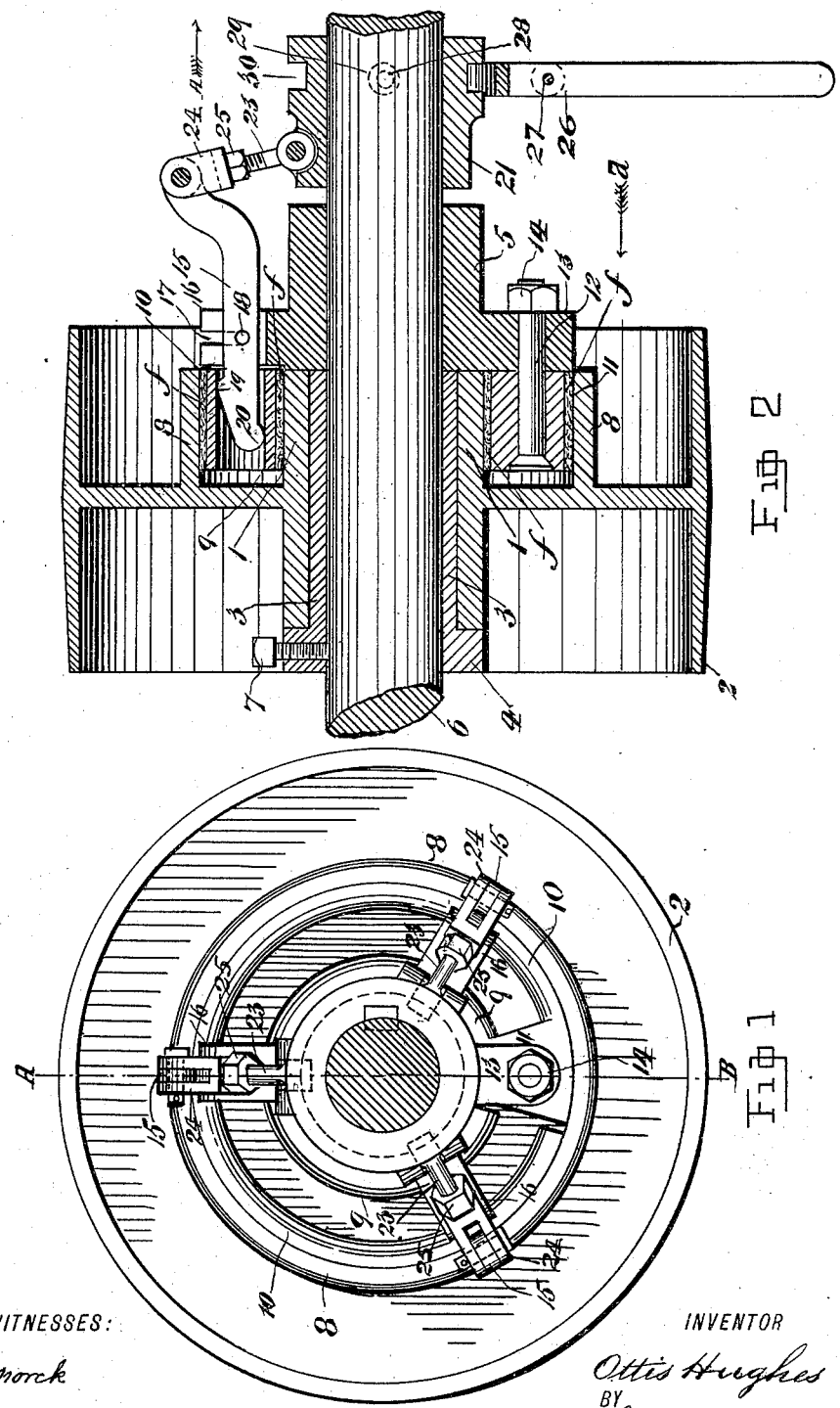
WITNESSES:
INVENTOR
Ottis Hughes
BY
Thompson & Bell
ATTORNEY.

No. 686,225. Patented Nov. 5, 1901.
O. HUGHES.
FRICTION CLUTCH.
(Application filed Apr. 23, 1901.)

(No Model.) 2 Sheets—Sheet 2.

WITNESSES:
Wm O. Morck
Hugh J Drummond

INVENTOR
Ottis Hughes
BY
Thompson Bell
ATTORNEY.

UNITED STATES PATENT OFFICE.

OTTIS HUGHES, OF INDIANAPOLIS, INDIANA, ASSIGNOR TO MINSTER MACHINE COMPANY, OF MINSTER, OHIO.

FRICTION-CLUTCH.

SPECIFICATION forming part of Letters Patent No. 686,225, dated November 5, 1901.

Application filed April 23, 1901. Serial No. 57,126. (No model.)

*To all whom it may concern:*

Be it known that I, OTTIS HUGHES, a citizen of the United States, residing at Indianapolis, in the county of Marion and State of Indiana, have invented new and useful Improvements in Friction-Clutches, of which the following is a specification.

My invention relates to certain new and useful improvements in friction-clutches and will be hereinafter more fully set forth and particularly pointed out in the claims.

The object of this invention is to provide an expansion-ring that will be composed of inner and outer concentric ring members, both of which members are formed of one integral piece, the friction contact of said outer and inner rings with the friction-surfaces of said clutch-pulley being obtained by expanding or separating said rings by suitable mechanism hereinafter described. I attain this object by means of the mechanism illustrated in the accompanying drawings, in which similar characters of reference designate like parts throughout the several views.

Figure 3:
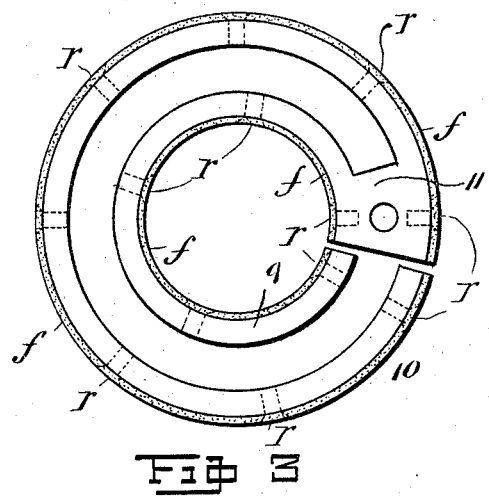
Figure 4:
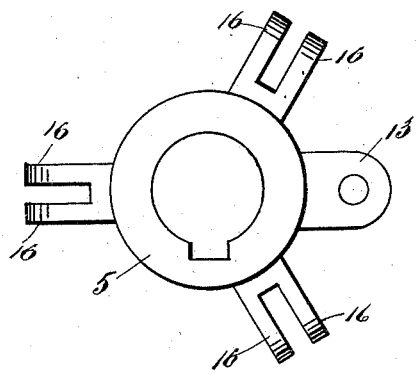

Figure 1 is an end elevational view of the clutch looking in the direction of the arrow *a* seen in Fig. 2. Fig. 2 is a transverse sectional elevational view of the clutch-pulley, taken through the line A B seen in Fig. 1. Fig. 3 is a detail view of the friction-ring, and Fig. 4 is a detail view of the lever-carrier.

The hub 1 of the pulley 2 is truly bored to freely turn on the sleeve or bushing 3 between the collar 4 thereof and the lever-carrier or sleeve 5. By and between said latter sleeve said pulley is maintained in position. The sleeve or bushing 3 is secured on the shaft 6 by a set-screw 7, and the sleeve 5 is either keyed or otherwise secured on said shaft 6 to turn therewith and to be maintained securely thereon. One end of the hub 1, that end or portion of said hub between the web of the pulley 2 and the lever-carrier 5, is truly turned on its outer peripheral surface, and integral on and at right angles with the web of said pulley 2 and concentric with the axis thereof is formed the flange 8, which is also truly turned on its inner surface concentric with the axis of the pulley 2. The friction-clutch ring is composed of two members—namely, the inner ring 9 and the outer ring 10—and these are formed of one integral piece separated or cut transversely to form annular spring or resilient members, which members are united by the integral separating-block 11, which latter is situated close to the transverse cut or split of the said rings 9 and 10, thereby providing an extended and unbroken arc of contact and materially adding to the resiliency of the said friction-rings. The separating-bar 11 is drilled to receive the pivotal pin 12, on which said ring is pivotally mounted, and said pin 12 is secured in the bore of the lug 13, formed on the carrier-sleeve 5, by the retaining-nut 14. Thus when the inner ring 9 is forced inwardly against the peripheral surface of the hub 1 of the pulley 2 and the outer ring 10 is forced outwardly against the inner peripheral surface of the flange 8 the driving force of the shaft 6 or the pulley 2, as the case may be, is transmitted directly from the friction-rings 9 and 10 to said pivotal pin 12 and the expanding-levers 15 are relieved of all undue transverse stress which would tend to bend or distort them and render them inoperative. The expanding-levers 15 of the friction-clutch rings 9 and 10 are disposed at equal distances apart around the lever-carrying sleeve 5 and are adapted to freely work between the guide-lugs 16, formed integral on said carrier 5. The guide-lugs 16 are provided with the guide-slots 17, in which latter the guide-pins 18 of the levers 15 freely work, and the said pins are provided for the purpose of retaining said levers in position and preventing them from moving longitudinally. The levers 15 are provided with the rounded bearing portions or toes 19 and 20, which project slightly above the top and bottom edges of said levers, and said toes are so situated relatively to each other that when the free ends of said levers 15 are moved outwardly said toes will bear against said friction-rings 9 and 10 to separate them and force them against the friction contact-surfaces of the pulley 2. The lines joining the opposing toes 19 and 20 are at an angle with the longitudinal axis of the levers 15 and form the short lever-arms of the said levers. The free or outer ends of the levers 15 are cranked or offset outwardly to provide suitable clearance or space for the proper working of the toggle-links 23. The traversing sleeve 21 is mounted on said shaft 6 to turn therewith and to be traversed longitudinally thereon, and said sleeve is provided with the lugs 22, to which are pivoted the ends of the toggle-links 23. The toggle-links 23 are composed of a fork end 24, into which are screwed the stem or eyebolt members, so that the lengths of said toggles may be varied and adjusted as the friction-rings 9 and 10 are worn. Lock-nuts 25 are also provided for locking said stems of the toggles to prevent them working loose after adjustment. The traversing sleeve 21 may be traversed on said shaft 6 either while the latter is in motion or at rest to either relieve said clutch-ring or engage the same through and by means of its operating-levers 15 by means of the operating or clutch lever 26, which latter is fulcrumed or pivoted on a fulcrum-pin 27, secured to any stable framework, and on the bifurcated ends of said lever 26 are secured the pins 29, which latter project sufficiently from said bifurcations 28 to enter the groove 30 of said traversing sleeve 21 and afford a sufficient bearing therein, and by these latter the said sleeve 21 is either retained in position or traversed as the operating-lever 26 is either held at rest or moved.

It is obvious that it is immaterial whether the shaft 6 or the pulley 2 be the driver, as the mechanism is operative under either condition of power transmission.

When it is required to release the friction-rings 9 and 10 from contact with the friction-surfaces of the hub 1 and the flange 8, the sleeve 21 is traversed on the shaft 6 in the direction of the arrow A by means of the lever 26 to cause the free ends of the clutch-lever 15 to approach radially near the said shaft, thereby releasing the contacting toes 19 and 20 of said levers from contact with the friction-rings 9 and 10 and permitting the latter to recede, by virtue of their resiliency, to their normal position and out of contact with the friction-surfaces of the hub 1 and the flange 8, thereby permitting the free rotation of the pulley on the shaft 6. It is obvious that when it is necessary to cause the friction or clutch rings 9 and 10 to engage or bind their opposing surfaces or the surfaces of the hub 1 and the flange 8 to cause the pulley 2 to turn with the shaft 6 the traversing sleeve 21 is traversed on said shaft in a direction opposed to that indicated by the arrow A till it reaches the position shown in Fig. 2, in which position the bearing-toes 19 and 20 of the levers 15 operate to expand or separate said rings 9 and 10 to bind them between said surfaces of the hub 1 and the flange 8 to cause said pulley 2 to rotate with said shaft 6. In order that the frictional resistance, between the bearing-surfaces of the ring members 9 and 10 and the friction-surfaces of the hub 1 and the flange 8 of the clutch-pulley 2, may be regulated, I provide a thin layer or sheathing of friction-producing material $f$, preferably fiber sheathing, as indicated by lines F, Figs. 3 and 3, which is first cut to the proper size and firmly secured to each of the surfaces of the ring members 9 and 10 by suitable rivets $r$ or other fastenings, which have their heads countersunk into said fiber covering to present a smooth even surface of contact.

Having thus fully described this my invention, what I claim as new and useful, and desire to cover by Letters Patent of the United States therefor, is—

1. In a clutch-pulley, the combination with a shaft, a pulley adapted to turn on said shaft, a friction or clutch ring composed of inner and outer split-ring members, said ring situated between the rim and the hub of said pulley, means whereby said friction or clutch rings are separated or spread apart to engage said pulley and means whereby said friction-ring is supported and secured to rotate with said shaft.

2. In a clutch-pulley, the combination with a shaft, a pulley adapted to turn on said shaft, a friction or clutch ring composed of inner and outer ring members both of which members are formed of one integral piece, and split or separated at or near their root or point of juncture to form independently-yielding friction-ring members, means whereby said rings are separated or spread apart to engage said pulley and means whereby said friction or clutch ring is supported and secured to turn with said shaft.

3. In a clutch-pulley, the combination with a shaft, a pulley adapted to turn thereon, and provided with parallel and concentric friction-surfaces, of a friction-ring composed of inner and outer ring members formed of a single integral piece and split or separated at or near their points of juncture, means whereby said ring is secured to turn with said shaft and means whereby said rings are separated or spread to contact or engage with said friction-surfaces.

4. In a clutch-pulley, the combination with a shaft, a pulley adapted to turn thereon and provided with parallel and concentric friction-surfaces, of a friction-ring composed of inner and outer ring members formed of a single integral piece, said rings adapted to loosely fit between said parallel friction-surfaces, levers for separating said rings, a lever-carrier secured on said shaft to turn therewith, and to which said friction-ring is pivoted and means for operating said levers.

5. In a clutch-pulley, the combination with a shaft, a pulley provided with a friction-flange, said pulley adapted to turn on said shaft, of a friction or clutch ring composed of inner and outer ring members both of which are formed in one integral piece and separated at or near their root or point of juncture, said clutch-ring situated between said friction-flange and the hub of said pulley, a lever-carrier secured on said shaft to turn therewith, a pin secured on said carrier and on which said friction or clutch ring is pivoted, a series of clutch-levers supported and guided by said lever-carrier and having their operative or fulcrum ends between said friction-ring members.

6. In a clutch-pulley, the combination with a shaft, a pulley adapted to turn thereon and provided with a friction-flange the face of which latter is parallel with the surface of hub of said pulley, of a friction or clutch ring composed of inner and outer ring members both of which are formed in one integral piece, and separated at or near their root or point of juncture, said clutch-ring situated between said friction-flange and the hub of said pulley, a lever-carrier secured on said shaft to turn therewith, a series of clutch-levers arranged around said carrier and guided by the latter, said levers having their operative or separating ends between the said friction-ring members, and means for operating said levers to expand or separate said friction members either while said shaft is in motion or at rest.

7. In a clutch-pulley, the combination with a shaft, a pulley adapted to turn thereon, a friction-clutch ring composed of outer and inner split-ring members having their bearing-faces covered with a friction-producing sheathing, said friction-ring situated between the rim and the hub of said pulley, a friction-producing sheathing on the bearing clutch-surface of said hub and the rim of said pulley, means whereby the said friction-ring members are spread apart to clutch said pulley, and means whereby said friction-ring is supported and secured to rotate with said shaft.

In testimony whereof I have hereunto set my hand in the presence of two subscribing witnesses.

OTTIS HUGHES.

Witnesses:
THOMPSON R. BELL,
A. S. HALACHER.